United States Patent [19]

Omori et al.

[11] 4,077,836
[45] Mar. 7, 1978

[54] APPARATUS FOR AUTOMATICALLY STARTING UP NUCLEAR REACTOR

[75] Inventors: Takashi Omori, Kita-Ibaraki; Sakae Sugiyama, Hitachi, both of Japan

[73] Assignee: Hitachi, Ltd., Japan

[21] Appl. No.: 613,430

[22] Filed: Sep. 15, 1975

[30] Foreign Application Priority Data

Sep. 20, 1974  Japan ................. 49-107742

[51] Int. Cl.² .................. G21C 7/06; G21C 7/00
[52] U.S. Cl. .................................... 176/22; 176/24
[58] Field of Search .............. 176/22, 195 EC, 20 R, 176/24, 25

[56] References Cited

U.S. PATENT DOCUMENTS

| | | | |
|---|---|---|---|
| 3,251,746 | 5/1966 | Jeffries | 176/22 |
| 3,284,312 | 11/1966 | West | 176/22 |
| 3,341,422 | 9/1967 | Gilbert | 176/22 |
| 3,356,577 | 12/1967 | Fishman | 176/22 |
| 3,366,544 | 1/1968 | Bunch | 176/22 |
| 3,424,653 | 1/1969 | Cohn | 176/22 |
| 3,778,347 | 12/1973 | Giras | 176/24 |
| 3,931,500 | 1/1976 | Berkebile | 176/24 |

FOREIGN PATENT DOCUMENTS

| | | | |
|---|---|---|---|
| 612,778 | 1/1961 | Canada | 176/22 |
| 793,771 | 4/1958 | United Kingdom | 176/22 |

OTHER PUBLICATIONS

IBM Systems Reference Library, IBM 1800 Functional Characteristics File No. 1800-1801; pp. 109-113.
Schultz, Control of Nuclear Reactors and Power Plants, McGraw Hill, 1955, pp. 245-255.

*Primary Examiner*—Verlin R. Pendegrass
*Assistant Examiner*—Donald P. Walsh
*Attorney, Agent, or Firm*—Craig & Antonelli

[57] ABSTRACT

An apparatus for automatically starting up a nuclear reactor, which causes control rods in the reactor to be withdrawn in the predetermined order according to the signal obtained by adding the heat-up ratio as a compenstory component determined by the reactor pressure to the deviation of the heat-up ratio of the reactor temperature from the predetermined heat-up ratio and which causes the reactor to be subjected to heat-up and pressurization by opening turbine bypass valves when the heat-up ratio exceeds a reference value.

10 Claims, 23 Drawing Figures

FIG. 12e
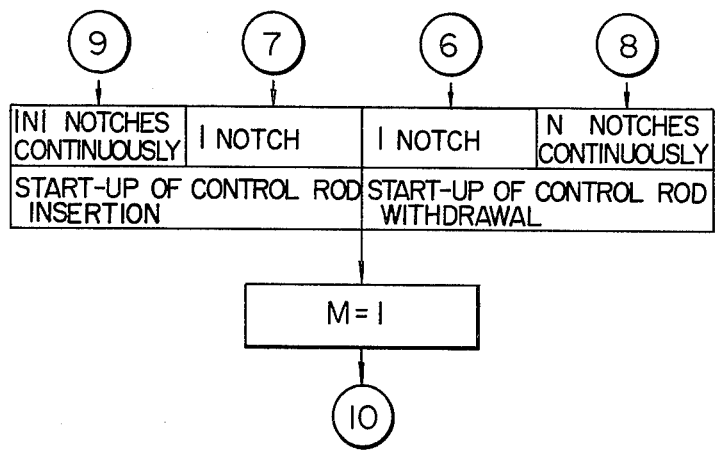
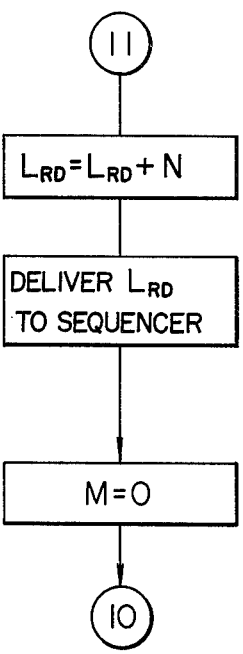
FIG. 12f
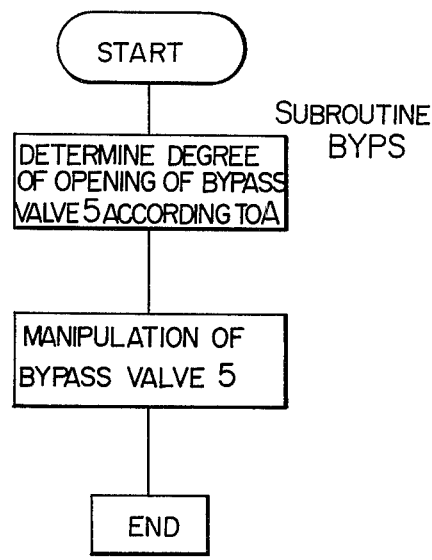

APPARATUS FOR AUTOMATICALLY STARTING UP NUCLEAR REACTOR

BACKGROUND OF THE INVENTION

1. Field of the Invention

The present invention relates to an apparatus for automatically starting up a nuclear reactor and more particularly to an apparatus for automatically manipulating a nuclear reactor until the temperature and the pressure reach the predetermined levels after the reactor has reached a critical state.

2. Description of the Prior Art

There are three essential steps in the starting-up operation of a nuclear reactor: critical manipulation, heat-up and pressurization manipulation, and power-up manipulation. These steps are performed in the order mentioned. The critical manipulation is defined as a step of gradually withdrawing the control rods when the reactor is in the resting state, until the reactivity $\rho$ of the reactor becomes unity. The reactivity of 1 means that the reactor is at the critical condition where nuclear fission in the reactor proceeds continuously and that the neutron flux to cause the following nuclear fission is constant. Namely, the reactor is said to be critical, subcritical and supercritical, respectively, when the reactivity is equal to, less and more than unity. Whereas the nuclear fission attenuates in the subcritical condition ($\rho < 1$), the fission proceeds indefinitely in the supercritical condition ($\rho > 1$) and the reactor may run away unless any safety control is performed. The critical manipulation is, in other words, to cause the nuclear reaction in the reactor to proceed from the nuclear resting state (where even if neutron flux is generated the resultant nuclear fission attenuates) to a state where the reactivity $\rho$ is 1 or slightly larger than 1, i.e. around 1.01, by gradually withdrawing the control rods.

Whether the reactor has got critical or not, is judged by checking the reactor period. The reactor period, expressed by the reciprocal $1/(dn/dt)$ of the rate $dn/dt$ of change in the neutron flux $n$ in the reactor with time $t$, is defined as the mean time required for the power level of the reactor to change by the factor $e = 2.71828$. The dimension of the reactor period is time. Namely, the period is infinite for the reactivity of 1, i.e. critical state, a negative finite value for the subcritical value, and a positive finite value for the supercritical state. The state of the reactor being critical can be identified by the fact that the reactor period assumes a positive value and the time during which the neutron flux is at a certain value lasts longer than, for example, a predetermined period. In such a critical state, the reactor thermal power is less than about 1% of the rated power.

After the reactor has become critical, the control rods are further withdrawn, while the level of the reactor water is kept constant, to subject the reactor to heat-up and pressurization. During this heat-up and pressurization process, the reactor is separated from a turbine and the like so that the supply of water into the reactor and the derivation of the steam are not normally carried out. Exceptionally, however, the decrement of a reactor water level caused by a reactor water purifying system is compensated by a water supply system, and some fractional quantity of the steam is taken out after the later stage of the heat-up and pressurization process, for the warming-up of the turbine.

The present invention provides an apparatus for automatically performing the manipulation of a reactor for heat-up and pressurization after the completion of the critical manipulation. For this purpose, the following problems must be solved.

First, for the heat-up and pressurization, the operator manually withdraws the control rods by monitoring various controlled variables so that the burden imposed on him is severe and the time required for manipulation widely varies depending upon the skill of operator. Secondly, it is specifically necessary in this stage to keep constant the heat-up ratio of the temperature in the reactor so as not to expose the pressure vessel to thermal impact. Thirdly, the reactivity in the heat-up and pressurization process is derived by summing the positive reactivity effect due to the withdrawal of the control rods and the negative reactivity effect due to the temperature in the reactor, but since the temperature varies, it is necessary for keeping the heat-up ratio constant to control the withdrawal of the control rods so as to compensate for the variation. Fourthly, since the negative reactivity effect varies non-linearly with the temperature in the reactor, it is difficult to compensate for the reactivity effect. Fifthly, the response to the variation of the reactor temperature caused due to the withdrawal of the control rods, is slow. Sixthly, since the pressure in the boiling water reactor has an influence on the reactor temperature, the reactivity should be corrected with respect to pressure.

The reactor thermal power now after the completion of the heat-up and pressurization manipulation is about 10% of the rated power and thereafter the steam is conducted to the turbine to increase the speed thereof while the power-up manipulation is performed by controlling the control rods and the recirculation flow.

The term "reactor temperature" used in this specification refers to the temperature of the water serving as coolant and moderator in the reactor or of the wall of the pressure vessel. Although in the start-up operation of a reactor the heat-up ratio of the temperature of the reactor water must be actually kept constant, it is difficult to measure the temperature exactly. Instead, the temperature at the wall of the pressure vessel may be conveniently used as the measure of the heat-up ratio. Accordingly, in this specification, the reactor temperature thus defined is used to represent the temperature of each portion useful to monitor the heat-up ratio of the reactor.

SUMMARY OF THE INVENTION

The object of the present invention is to provide an apparatus for automatically performing the heat-up and pressurization manipulation with the heat-up ratio of the reactor temperature maintained constant.

According to the present invention, the control rods are automatically withdrawn and inserted in the heat-up and pressurization stage so as to maintain the heat-up ratio of the reactor temperature constant and the component for compensating the heat-up ratio, which component is obtained from the reactor pressure or the reactor temperature, is added as a standard value.

BRIEF DESCRIPTION OF THE DRAWINGS

FIGS. 12a to 12f are the flow charts according to which the embodiment shown in FIG. 5 are realized by the use of electronic computers.

FIG. 13 shows how the sequence of manipulating the control rods, the coordinates of the control rods and the manipulated variables are stored in the computors.

DESCRIPTION OF THE PREFERRED EMBODIMENT

Figure 1:
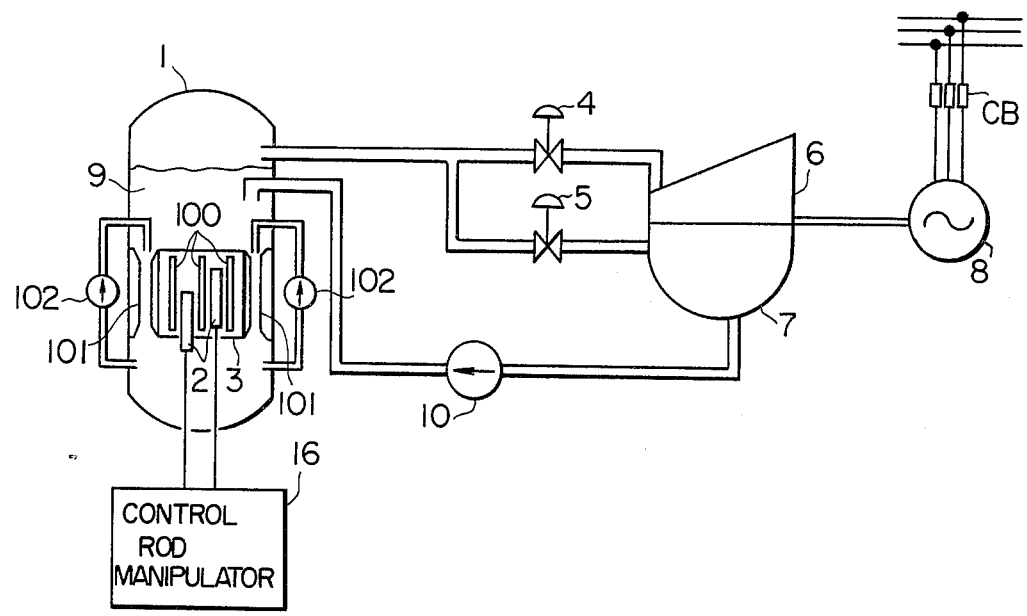
FIG. 1 schematically shows an atomic power plant.

FIG. 1 is a general view of an atomic power plant. A pressure vessel 1 contains therein a reactor core 3. The reactor core 3 is immersed in cooling water 9 and control rod 2 and fuel assembly 100 are housed in the core 3 in a well known structure. When the control rods 2 are withdrawn by means of control rod manipulator 16, the reactivity increases. Besides the control rods 2, jet pumps 101 are provided to change the reactor power. The coolant water 9 taken out of the lower part of the reactor core 3 is pressurized by recirculation pumps 102 and the pressurized water is gushed from the jet pumps 101 into the upper part of the reactor core 3. The quantity of the jetted water is termed the recirculation flow and if the recirculation flow is increased, the reactor thermal power increases. As described later, in the heat-up and pressurization process, the reactor thermal power is not increased by increasing the recirculation flow. The control of the reactor thermal power by changing the recirculation flow is performed only at high power performance. The steam generated in the pressure vessel 1 is sent through a steam control valve 4 to a turbine 6 and drives the turbine 6. The turbine 6 is directly coupled to a generator 8 and the electric power generated by the generator 8 is sent to loads via circuit breakers CB. A condenser 7 turns the steam which performed work on the turbine 6 into water, which is returned through a water supply pump 10 to the pressure vessel 1. The rotating speed and therefore the quantity of water spouted out, of the water supply pump 10 is so controlled as to maintain the level of the coolant water 9 constant. A bypass valve 5 is used to conduct the steam directly to the condensor 7. This is an atomic power plant in its simplest form. In this plant, all the control rods are inserted to full extent in the resting state, with the valves 4 and 5 closed completely and the pumps 102 and 10 stopped.

Figure 2:
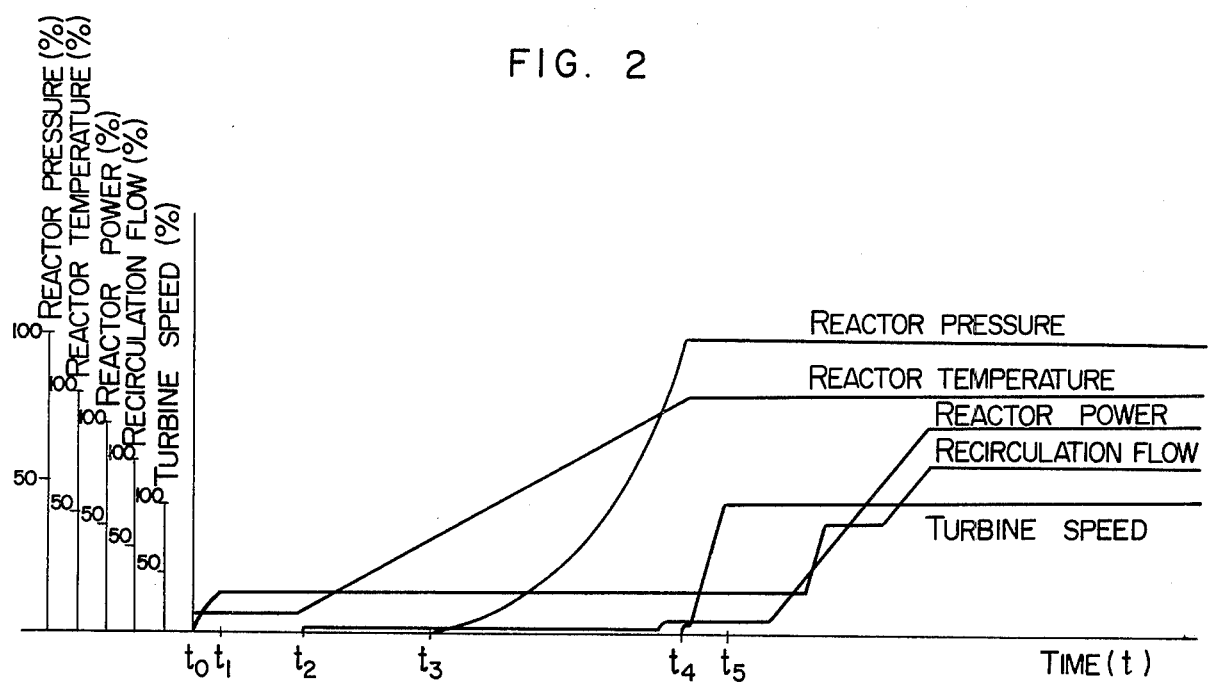
FIG. 2 illustrates how the respective controlled variables are changed in the start-up procedure of the reactor.

FIG. 2 shows how the respective controlled variables are changed in the start-up procedure of such an atomic power plant. In FIG. 2, the complete resting state corresponds to the point $t_o$ of time. For the start-up of the plant, the recirculation pump 102 is first rotated and when the recirculation flow reaches 25 to 30% of its rated value, i.e. at the instant $t_1$, the control rods are gradually withdrawn. The reactor is still subcritical and it is considered to be critical at the instant $t_2$. The reactor thermal power in the initial stage of the critical state is less than 1% of its rated power. The further withdrawal of the control rods after the criticality is followed by the gradual rise of the reactor temperature and when the reactor temperature reaches the boiling point $t_3$, the reactor pressure begins to rise. In this case, the control rods are so withdrawn as to maintain the rate of change in the reactor temperature constant. The reactor pressure and temperature reach their rated value at the instant $t_4$. After $t_4$, since steam is sent to the turbine 6 by opening the steam control valve 4, to gradually increase the speed of the turbine 6. When the speed of the turbine 6 reaches its rated value at the instant $t_5$, the circuit breakers CB are closed synchronously. Thereafter, the reactor thermal power is increased through the combined control of the recirculation flow and the control rods. As apparent also from FIG. 2, the reactor start-up procedure is roughly divided into three steps: the critical manipulation ($t_0$–$t_2$), the heat-up and pressurization manipulation ($t_2$–$t_4$), and the power-up manipulation (after $t_4$). The present invention contemplates the automatization of the heat-up and pressurization step. There are various problems to be solved for the automatization of the heat-up and pressurization manipulation. These will be described with the aid of drawings.

Figure 3:
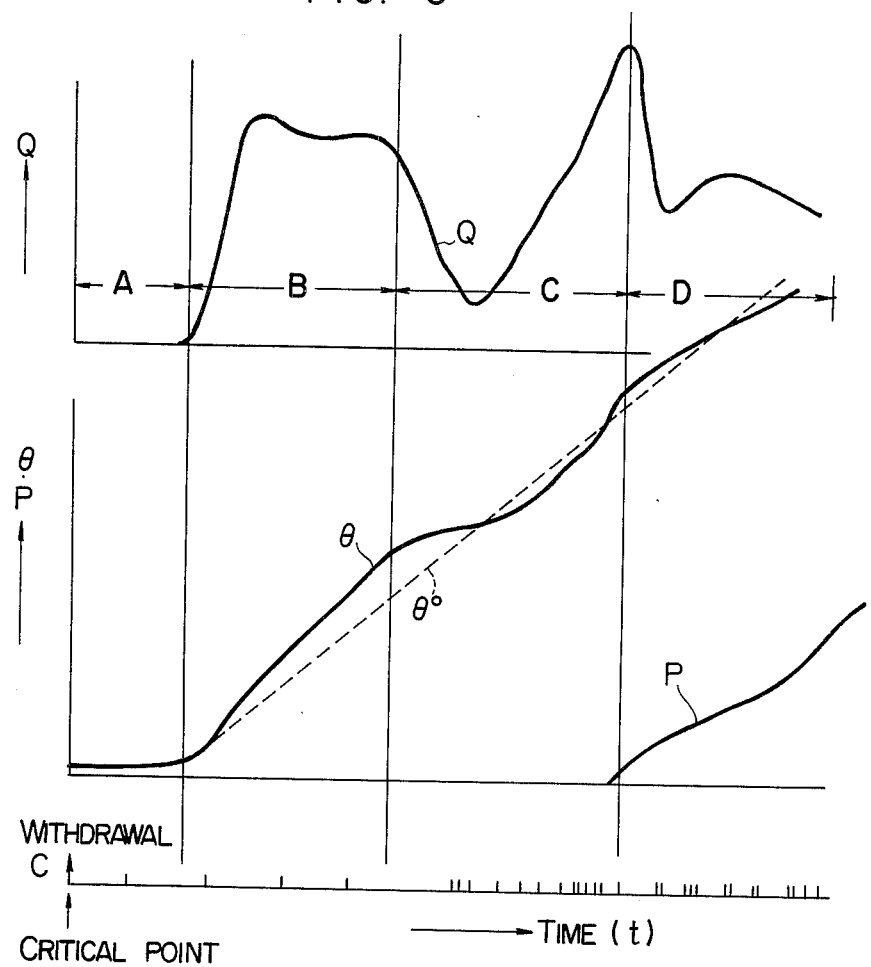
FIG. 3 shows how the plant outputs respond to the manipulation of the control rods when the rods are manually moved in the heat-up and pressurization process.

FIG. 3 shows the change in the reactor temperature in case where the heat-up and pressurization manipulation in an actual plant is manually performed. This figure shows the variation of a reactor thermal power Q a reactor temperature $\theta$ and a reactor pressure P with a control rod manipulation c, plotted over about 3 hours after criticality. The solid curve $\theta$ corresponds to the reactor temperature characteristic of the actual reactor under consideration and the broken curve $\theta_0$ to the predetermined standard heat-up curve. In the region A corresponding to the initial stage of criticality, the reactor thermal power Q is very small. In the earlier stage of the region B, the reactor thermal power Q rapidly increases so that the heat-up ratio $d\theta/dt$ deviates positively from the standard value $d\theta_0/dt$. In the later stage of the region B, the operator, judging that the heat-up ratio is excessive, prolongs the period of manipulating the control rods to suppress the increase in the reactivity due to the withdrawal of the control rods. Accordingly, due to the negative reactivity effect owing to the rise in the reactor temperature, the reactor thermal power Q and the reactor temperature $\theta$ fall together. In the later stage of the region C, too great a decrease in the reactor thermal power Q is prevented by frequently withdrawing the control rods and therefore the thermal power Q is again excessive to cause too great a heat-up ratio near the end of the region C. The heat-up ratio becomes relatively stable in the region D. As described above, the reactor temperature $\theta$ begin to rise from room temperature in the performance of a reactor within 2 to 3 hours after criticality, but since the negative reactivity due to the reactor temperature $\theta$ increases with the increase in the reactor temperature, it is difficult to maintain the heat-up ratio constant. The reactor pressure P gradually rises in the region D and it takes 4 to 5 hours until the rated pressure is reached. After the region D, the negative reactivity effect still increases due to the rise in the reactor temperature $\theta$ so that to keep the reactor thermal power and the heat-up ratio constant is difficult. Moreover, since the composite reactivity effect due to the withdrawal of the control rods and the reactor temperature decreases relatively with the increase in the negative reactivity effect due to the rise in the reactor temperature, the frequency of the control rod manipulations must be increased to maintain the heat-up ratio constant.

As described above, the manual control of the heat-up and pressurization manipulation to maintain the rate of change in the reactor temperature constant is generally difficult and has a drawback that the manipulation must be frequent especially in the later stage of the procedure. Further, before and after the reactor coolant water boils, that is, before and after the reactor pressure begins to rise due to the boiling of the water, the factors to affect the reactor temperature $\theta$ change while the influence by pressure is involved after the water has begun to boil.

Figure 4:
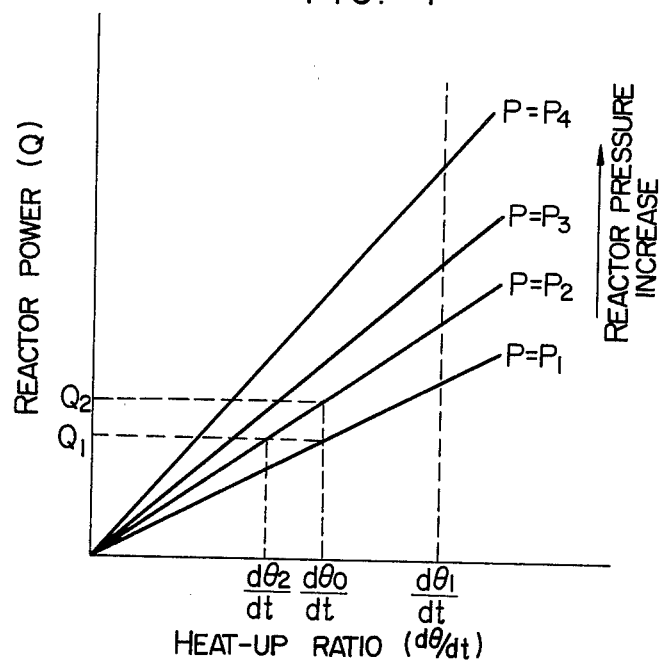
FIG. 4 shows the variation of the heat-up ratio of the reactor temperature with the reactor power.

Before the water boils, the heat-up ratio $d\theta/dt$ of the water can be kept constant by controlling the reactor thermal power Q to be constant. The heat-up ratio $d\theta/dt$ before the boiling of the water is given by the following formula.

$$\frac{d\theta}{dt} = \frac{K \cdot Q}{V \cdot C} \quad (1),$$

where Q is the reactor thermal power, K a constant, C coolant equivalency density (average taken over water and core structure), and V the coolant equivalency volume (average taken over water and core structure). Since V and C are almost fixed, $d\theta/dt$ is roughly proportional to the reactor thermal power Q. On the other hand, when the temperature rises and steam starts to be generated (in the pressurization stage), the formula (1) is more complicated but equivalent to the case where the value of C decreases. Therefore, when the power Q is constant, the heat-up ratio increases in accordance with the decrement of C. However, since in the pressurization stage the loss of heat from the reactor increases and a part of steam generated is consumed for the warming-up of the turbine, then a larger increase in the reactor thermal power must be introduced at high reactor pressure than at low reactor pressure, so as to obtain the same heat-up ratio. Namely, as shown in FIG. 4, when the pressure P is constant, e.g. $P = P_1$, the reactor thermal power Q is proportional to the heat-up ratio $d\theta/dt$. For higher reactor pressure, however, the reactor thermal power Q must be increased faster than before, so as to keep the heat-up ratio constant. For example, in case where $P = P_1$, $Q = Q_1$, the reference heat-up ratio $d\theta/dt = d\theta_0/dt$, the shift of the pressure P to a higher value $P_2$ causes the fall of the heat-up ratio down to $d\theta_2/dt$. In order to maintain the reference heat-up ratio $d\theta_0/dt$, the reactor thermal power Q must be increased to $Q_2$. The heat-up ratio $d\theta_1/dt$ is the allowable upper limit and the performance of the reactor in the region higher than the limit is prohibited.

According to the present invention, therefore, heat whose quantity is equal to that of the lost heat absorbed by the turbine and the reactor is additionally supplied so that the heat-up ratio may be kept constant. According to the present invention, the reactor pressure is used as a controlled variable serving as the index of the additional heat supplied to compensate for the lost heat absorbed in the turbine and the reactor. Also, the reactor temperature correlated to the reactor pressure is used as such an index. The difference between the case where the index is based on the pressure and the case where the index is based on the temperature, only affects the input-output characteristic. Since higher accuracy can be obtained by using the index based on the reactor pressure, the reactor pressure is exclusively used as the index in the following description of the embodiments.

Figure 5:
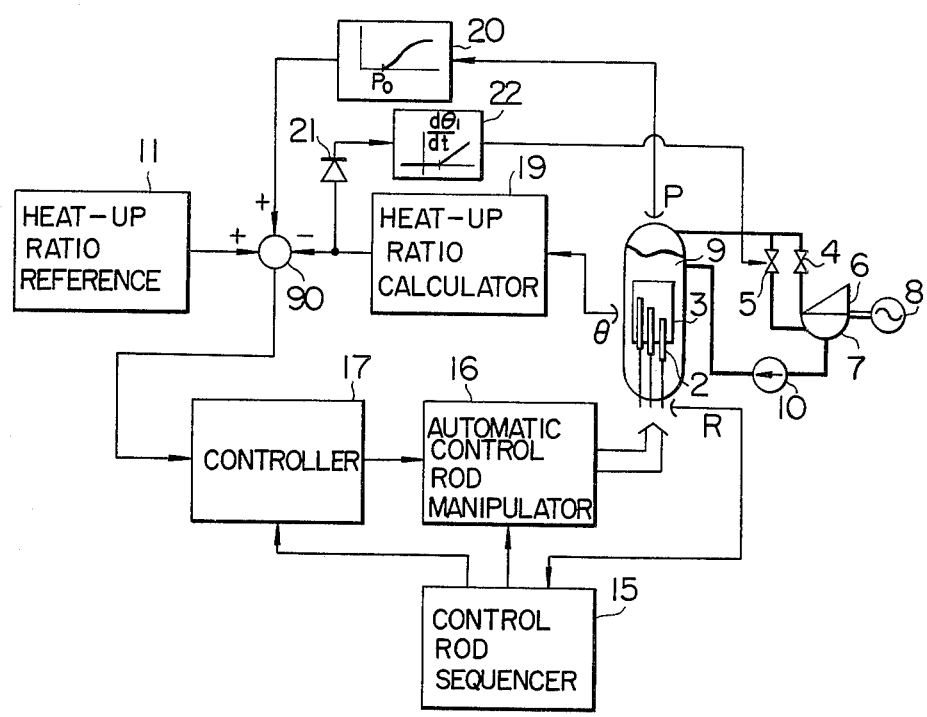
FIG. 5 shows an apparatus as one embodiment of the present invention, in which the heat-up ratio is compensated on the basis of the reactor pressure.

FIG. 5 shows an apparatus for automatically starting up a nuclear reactor, as a first embodiment of the present invention. In this embodiment, the reactor pressure P, the reactor temperature $\theta$ and the control rod position R are used as inputs. A heat-up ratio reference 11 delivers a signal indicative of a heat-up ratio $d\theta/dt$ of the reactor temperature $\theta$. The output of the heat-up ratio reference 11 is applied to a summing point 90 which also receives the output of a heat-up ratio calculator 19. The calculator 19 is a kind of differentiating circuit which receives the reactor temperature $\theta$ as input and delivers its time derivative, i.e. heat-up ratio $d\theta/dt$, as output. The combination of a unidirectional passage circuit 21 and a bypass valve controller 22 serves to open a turbine bypass valve 5 when the heat-up ratio $d\theta/dt$ of the actual reactor temperature $\theta$ calculated by the heat-up ratio calculator 19 exceeds a predetermined allowable heat-up ratio $d\theta_1/dt$. Upon opening of the turbine bypass valve 5, the reactor pressure lowers and the decrease in the reactor temperature heat-up ratio follows. A heat-up ratio compensator 20 receives the reactor pressure P as input. The compensator 20 is characteristic of the present invention and the detailed description thereof will be made later.

A control rod sequencer 15 receives the positions R of all the control rods 2 as input and stores them. The sequencer 15 also stores the order of manipulating all the control rods 2 in the heat-up and pressurization process. A controller 17 receives the output of the adder 90 and delivers an output corresponding thereto, having a function of, for example, proportional integration. The action of the sequencer 15 upon the controller 17 is as follows. In general, the amplitude of the rate of change in the reactivity caused by shifting a certain control rod by a given distance varies depending upon the position of the rod in the core and the distance of insertion of the rod into the core. This is known as the control rod worth. Namely, the rate of change in the reactor output due to the withdrawal of a control rod near the center of the reactor core by a distance is greater than that due to the withdrawal of a control rod near the periphery of the core by the same distance. Moreover, the change in the reactor thermal power due to the withdrawal or insertion of a particular rod by a distance when it is inserted up to 50% of the distance of full insertion, is greater than when it is inserted up to 90% of the distance of full insertion. Accordingly, the sequencer 15 anticipates and calculates the change in the reactor thermal power that would be caused due to the shift of the control rod to be next manipulated by a predetermined distance, and increases or decreases the control gain of the controller 17 when the reactivity effect is low or high, respectively, to keep the loop gain of the closed control circuit constant. An automatic control rod manipulator 16 serves to insert or withdraw each control rod by the distance determined in accordance with the output of the controller 17. The control rod to be next manipulated is selected by the sequencer 15. The output of the controller 17 vanishes when each control rod is fully inserted and the output increases proportionately as the distance of withdrawal of the rod increases. Therefore, the automatic control rod manipulator 16 withdraws the control rods when the output of the controller 17 is increasing while the manipulator 16 inserts the rods when the output is decreasing.

The control rod drive mechanism is usually actuated by an electric-motor or through hydraulic power and the withdrawal and the insertion of the control rods are continuous with the speed of movement constant. Accordingly, the manipulated variable of the control rod in the automatic control rod manipulator 16 is the duration of withdrawl or insertion operation. Especially in case of hydraulic drive, the distance corresponding to one notch of control rod movement is fixed and the manipulated variable in that case is the number of notches. The duration or the notch number increases with the absolute value of the rate of change in the output of the controller 17.

The combination of the control rod sequencer 15, the automatic control rod manipulator 16 and the controller 17 may be replaced by an electronic computor. Although these devices are used in the present invention, the detailed description thereof is not given here since they do not form the gist of the invention. The application of an electronic computor to the embodiment of the present invention will be described later with the aid of flow charts. The heat-up ratio compensator 20 mentioned above will now be enlarged upon. Before and after steam has been generated, the reactor characteristic is different and specifically in the latter case the reactor pressure rises so that the relationship between the heat-up ratio $d\theta/dt$ and the reactor thermal power Q becomes non-linear, as described above with the formula (1). The compensator 20 receives the pressure P and changes the reference value of heat-up ratio in accordance with the value of the received pressure to compensate for the non-linear component.

Figure 6:
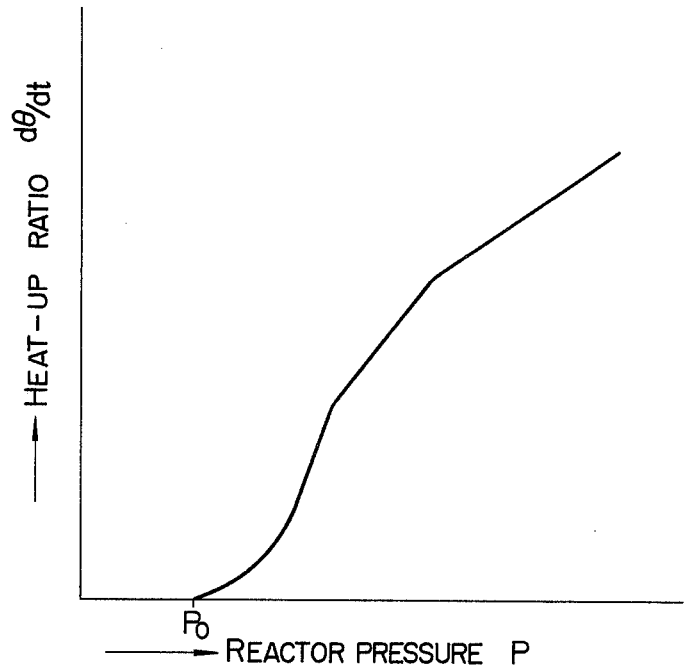
FIG. 6 shows the relationship between the heat-up ratio and the reactor pressure.

The reactor temperature is intended to be increased by increasing the value of the heat-up ratio through the control of the compensator 20, but since there is loss of heat in the state of the reactor being highly pressurized, such as heat absorbed in the pressure vessel and heat used for the warming-up of the turbine, the component of heat increased by increasing the heat-up ratio will be canceled by these lost heat. Therefore, the effective heat-up ratio can be kept constant by increasing the real heat-up ratio. The characteristic of the heat-up ratio compensator 20 is as shown in FIG. 6. The compensator 20 begins to deliver an output when the reactor pressure P reaches a predetermined value Po and before the pressure $P_o$ is reached, it delivers no output. The characteristic of the compensator 20 is such that the increase in the heat-up ratio compensate for the lost heat. The differential coefficient of the curve in FIG. 6 decreases with the increase in the reactor pressure.

According to the apparatus embodying the present invention, before the pressure $P_o$ is reached, the control rods are withdrawn in a predetermined order at such intervals that the rate of change in the reactor temperature $\theta$ becomes equal to the reference value of heat-up ratio given by the heat-up ratio reference 11. In this case, the generated heat is considered to be used for heat-up with little loss and the reactor temperature will assure the given heat-up ratio. When the reactor pressure P reaches the value $P_o$, however, various heat losses take place and the constant heat-up ratio cannot cover the decrease in the reactor temperature due to the losses. Since the compensator 20 compensate for the losses, the effective heat-up ratio can be maintained constant. When the heat-up ratio is excessive, the bypass valve 5 is opened by the bypass valve controller 22 to lower the reactor pressure and therefore the heat-up ratio. It is after the generation of steam that the bypass valve 5 enjoys its effect.

As described above, according to the present invention, the heat-up and pressurization process can be automatically performed while the heat-up ratio is kept constant. Another problem to be solved in realizing the present invention is that the effect of control rod manipulation on the reactor temperature appears with an appreciable delay. This problem is solved by the present invention in the following manner. With the embodiment shown in FIG. 5, the response of the change in the reactor temperature to the manipulation of rods cannot be free from dead time and transfer lag, as shown in FIG. 3, so that the method in which the reactor temperature is used as the controlled variable cannot attain a high quality of control. According to the present invention, there are utilized a fact that the heat-up ratio of the reactor temperature is a function of the reactor thermal power and a fact that the response of the reactor thermal power to the rod manipulation is relatively swift. Namely, the closed loop control in which the reactor thermal power is controlled in a minor loop, is performed by producing an index signal for the reactor thermal power in accordance with the signal representing the deviation of the reactor temperature heat-up ratio between setting and real one. Consequently, the reference value of the reactor thermal power is corrected and compensated on the basis of the heat-up ratio obtained after a certain delay. If the actual heat-up ratio is larger than the reference heat-up ratio, the reference value of the reactor is lowered. Moreover, the desired heat-up ratio is swiftly restored by the simultaneous manipulation of the bypass valve 5 which can provide a swift response. If, on the other hand, the actual heat-up ratio is less than the reference value, the reference value of the reactor thermal power is increased. Thus, the heat-up and pressurization manipulation from criticality up to rated pressure can be automatized by the use of an excellent control system which can always maintain the heat-up ratio constant.

Figure 7:
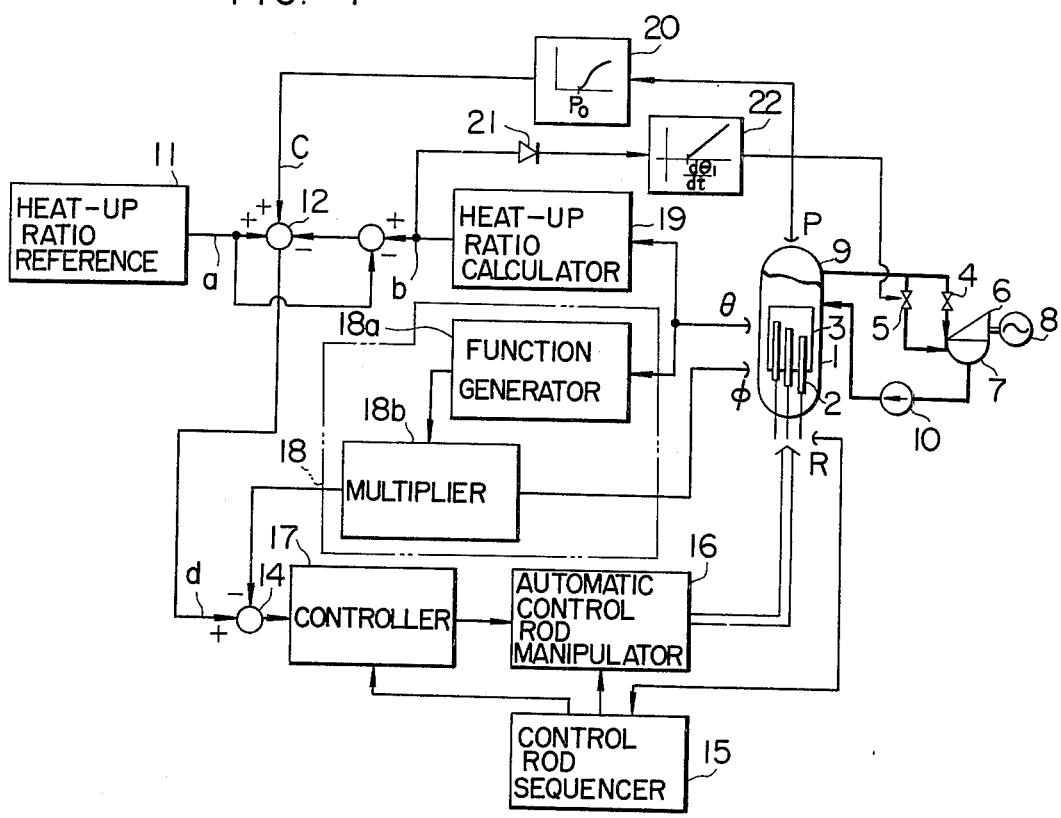
FIG. 7 shows another apparatus as a second embodiment of the present invention, in which a minor loop is provided to produce a standard signal for reactor thermal power from the deviation of the heat-up ratio so as to improve the response speed of the control system.

FIG. 7 shows another embodiment of the present invention, in which the parts and the elements indicated by the same reference numerals as in FIG. 5 are equivalent components. The difference of this embodiment from that shown in FIG. 5 is the provision of a minor loop system for using the signal representing the deviation of the heat-up ratio from the standard value, as the index signal for the reactor thermal power so as to improve the speed of response in the control of heat-up ratio. In FIG. 7, summing points are indicated at 12, 13 and 14. The index signal $d$ applied to the circuit 17 is given by the formula (2) below.

$$d = 2a - b + c \qquad (2),$$

where $a$, $b$ and $c$ are respectively the outputs of the circuits 11, 19 and 20.

Figure 8:
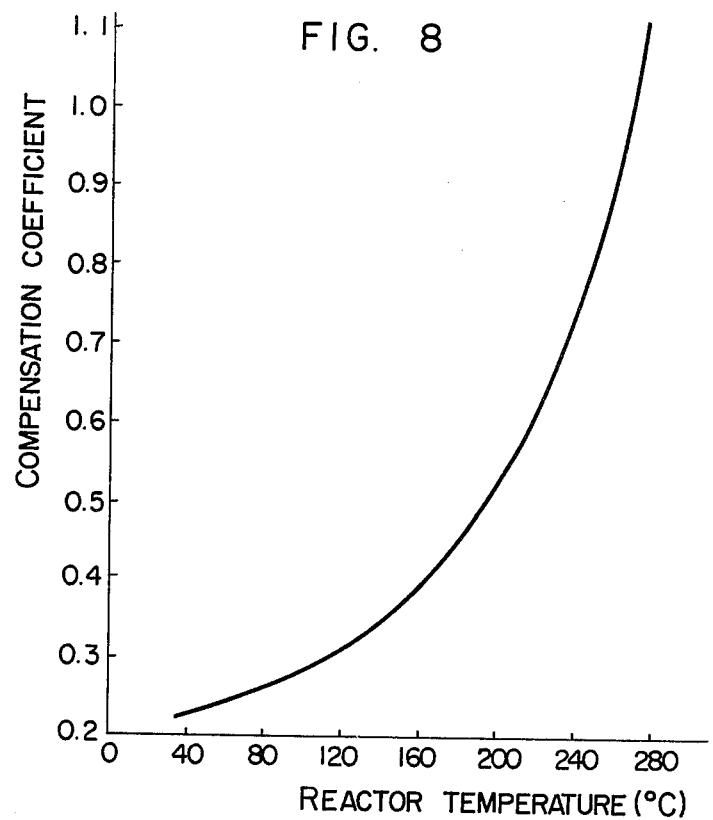
FIG. 8 shows the relationship between the compensation coefficient and the reactor temperature, in case of compensating the reactor thermal power on the basis of the reactor temperature.

If the heat-up ratio is constant, $a = b$ and therefore $d = a + c$ (heat-up ratio setting signal plus heat-up ratio compensation signal). This embodiment uses as the system for controlling the reactor thermal power the minor loop control system which produces the signal $d$ as an index signal. At numeral 18 is indicated a feedback circuit of the control system, which provides an output corresponding to the thermal power Q (equivalent to the neutron flux $\phi$ in the reactor) of the reactor and also corrects the power Q on the basis of the reactor temperature $\theta$ since the reactor thermal power detector (not shown) is affected by the reactor temperature. FIG. 8 shows the relationship between the compensation coefficient and the reactor temperature, in case of compensating the reactor thermal power on the basis of the reactor temperature. Reference numeral 18a indicates a function generator whose characteristic is as shown in FIG. 8 and numeral 18b designates a multiplier. The other components of this embodiment are the same as those of the embodiment in FIG. 5 and the description thereof is omitted.

With this constitution, if the reactor pressure is kept constant, the heat-up ratio varies almost linearly with the reactor thermal power as described above. The response of the reactor thermal power to the rod manipulation is faster than that of the heat-up ratio to the rod manipulation also in this case. In this embodiment, if the actual heat-up ratio deviates positively or negatively from the reference value, the deviation first of all appears in terms of the reactor thermal power signal fed back from the reactor so that the minor loop control system controls the deviation. Then where the deviation appears in terms of the heat-up ratio, it is expressed as the change in the index signal for the reactor thermal power. When the pressurization process has set in, the heat-up ratio is so compensated as to be kept constant by the output of the heat-up ratio compensator 20, as described with the embodiment in FIG. 5.

Figure 9:
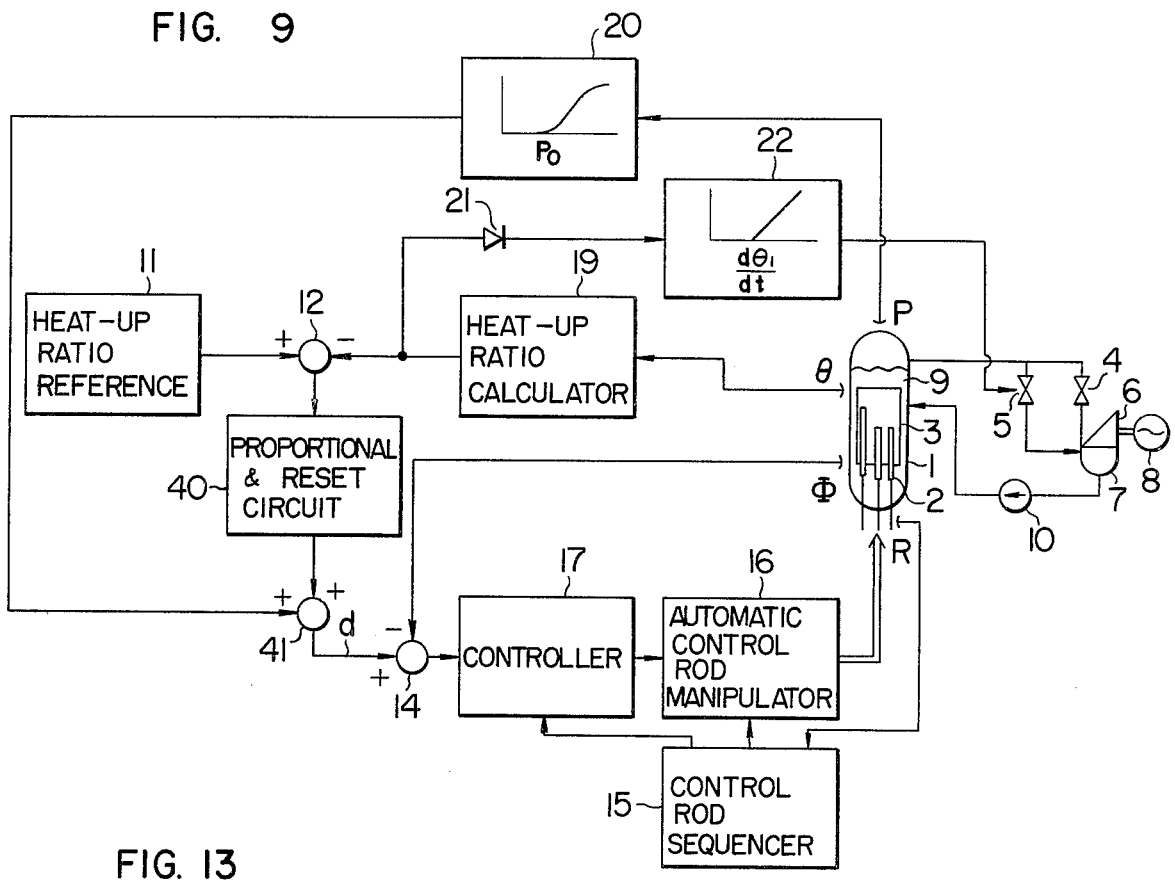
FIG. 9 shows another apparatus as a third embodiment of the present invention, which is a variation of the embodiment shown in FIG. 7.

The embodiment shown in FIG. 7 has a relatively complicated circuit since the summing points 12 and 13 are employed to use the signal representing the deviation of the heat-up ratio as the index signal for the reactor thermal power. However, this circuit can be simplified as shown in FIG. 9 by using, for example, a widely used proportional and reset circuit 40. The difference between the output of the heat-up ratio reference 11 and the output of the heat-up ratio calculator 19 is obtained from the summing point 12 and the difference is applied to the proportional and reset circuit 40. Then, the outputs of the proportional and reset circuit 40 and the heat-up ratio compensator 20 are summed at a summing point 41 and the resultant signal is used as a signal for presetting the reactor thermal power. In the embodiment shown in FIG. 7, the reactor thermal power $\phi$ is corrected on the basis of the reactor temperature $\theta$, but this artifice can be omitted as the case may be.

With these circuit configurations, the heat-up and pressurization manipulation can be so performed as to maintain the heat-up ratio constant. These circuits in FIGS. 7 and 9 has a faster response speed than that shown in FIG. 5.

According to the present invention, the conventional manual manipulation of the control rods, which is very complicated and needs well-skilled techniques, in the heat-up and pressurization process as a part of the reactor start-up procedure can be replaced by an automatic system which can attain a uniform heat-up ratio and diminish the labor of the operator.

Figure 10:
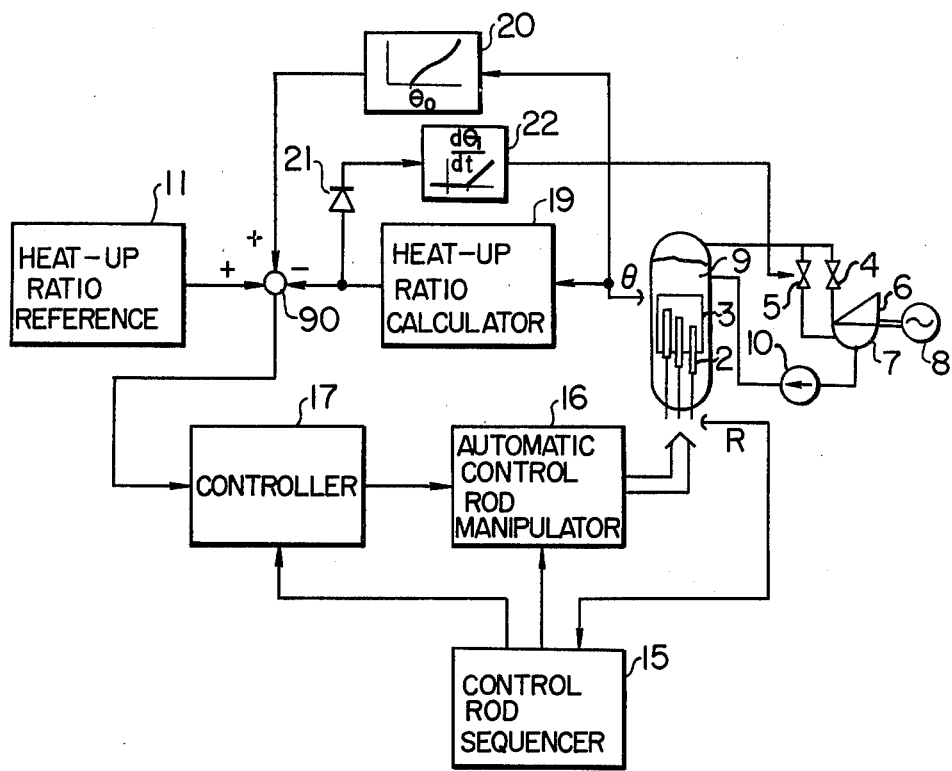
FIG. 10 shows another apparatus as a fourth embodiment of the present invention, in which the heat-up ratio is compensated on the basis of the reactor temperature instead of the reactor pressure.
Figure 11:
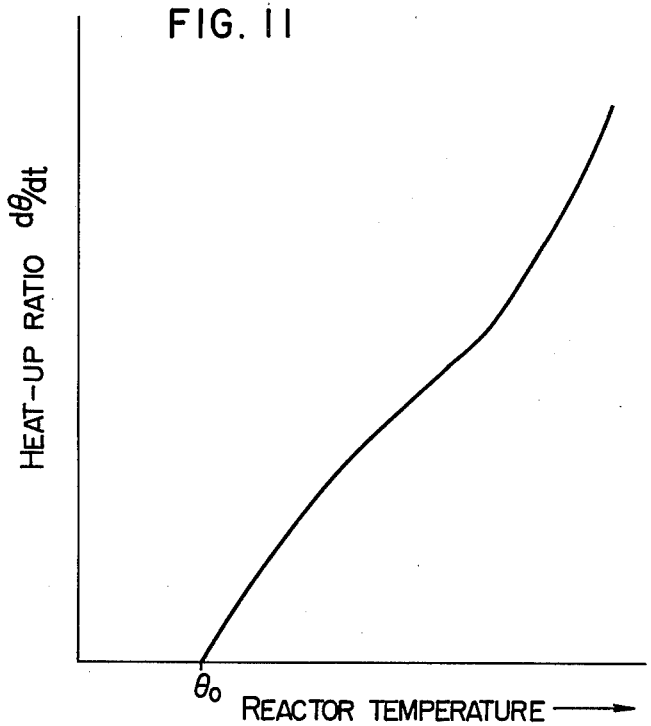
FIG. 11 shows the relationship between the reactor temperature and the heat-up ratio $d\theta/dt$, in the embodiment shown in FIG. 10.

As described above, to obtain the heat-up ratio from the reactor temperature is equivalent to the derivation of the heat-up ratio from the reactor pressure. And in order to obtain the heat-up ratio from the reactor temperature, the reactor temperature $\theta$ instead of the reactor pressure P has only to be used as an input, as shown in the circuit shown in FIG. 10. In that case, the characteristic of the output, i.e. the heat-up ratio $d\theta/dt$, with respect to the input, i.e. the reactor temperature $\theta$, is as shown in FIG. 11. The temperature $\theta_0$ at which the compensator 20 starts delivering an output, is the reactor temperature corresponding to the reactor pressure $P_o$ in FIG. 6. Moreover, it will be very easy to build such modified circuits as shown in FIGS. 7 and 9 even in case where the heat-up ratio is compensated by the reactor temperature.

Figure 12A:
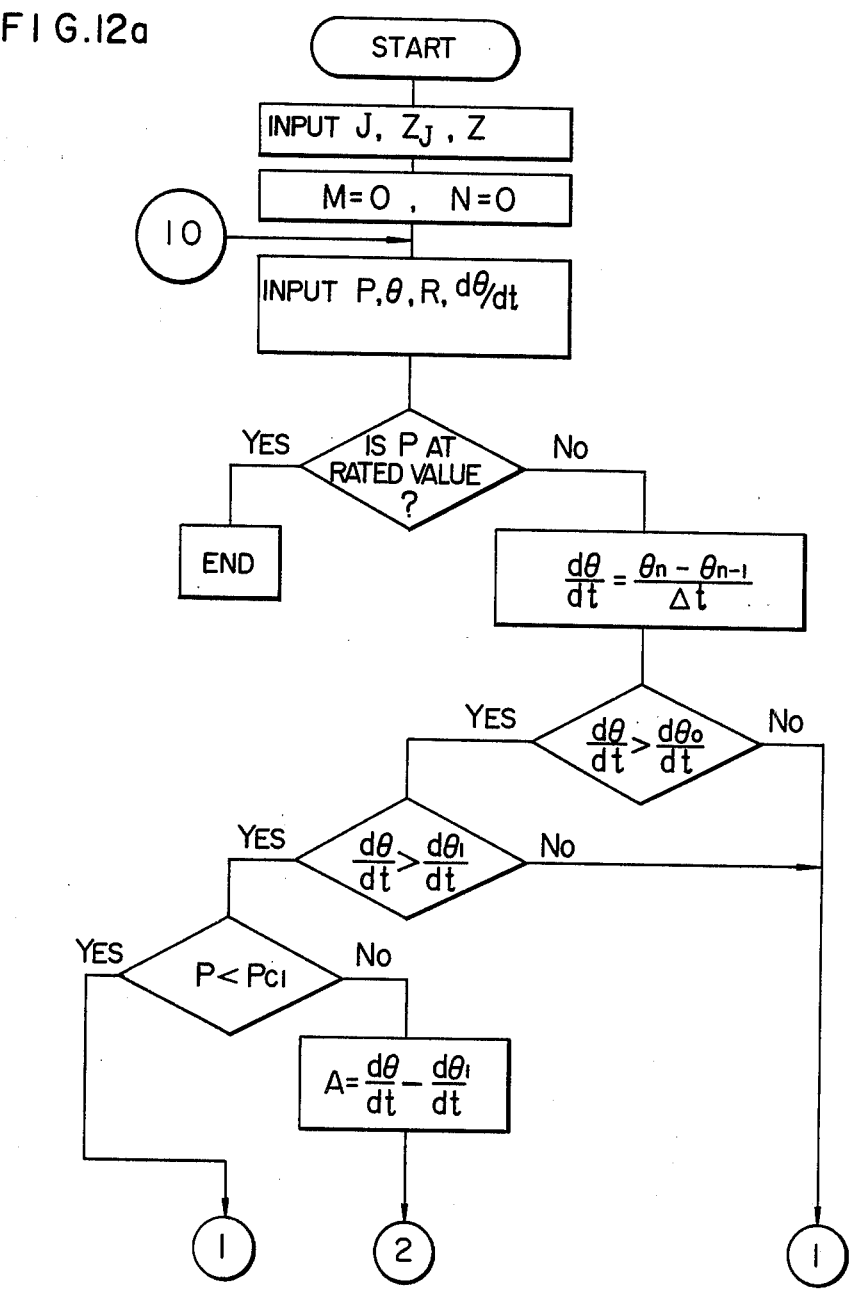
Figure 16:
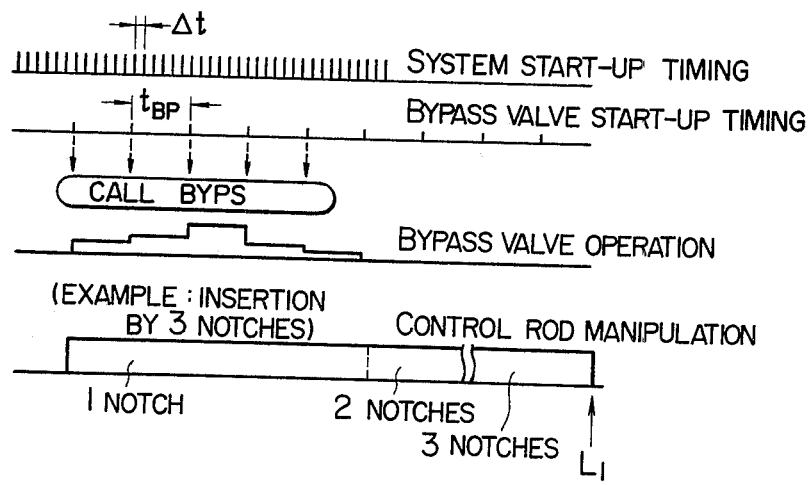
FIG. 16 shows on the same time base the periods of system start-up, bypass valve manipulation and control rod manipulation.

FIGS. 12a to 12f show flow charts useful for realizing the apparatus according to the present invention by the use of an electronic computor. In FIG. 12a, upon instruction of the start of control, the information J, $Z_J$ and Z of the present positions of the control rods is introduced as an input and then M and N are set equal to zero. Next, the reactor pressure P, the reactor temperature $\theta$, the positions R of insertion of all the control rods and the reference heat-up ratio $d\theta_0/dt$ are introduced at regular intervals $\Delta t$. If the reactor pressure P is at or above its rated value, the heat-up and pressurization manipulation is considered to have been completed and the further manipulation to follow is stopped. When the pressure P is below the rated value, the actual heat-up ratio $d\theta/dt$ is obtained. This ratio can be obtained by making the quotient $(\theta_n - \theta_{n-1})/\Delta t$, where $\theta_n$ the reactor temperature at present and $\theta_{n-1}$ is the reactor temperature at the moment earlier by $\Delta t$ than present. This artifice is only an example and there are various other methods of obtaining the heat-up ratio with higher accuracy. As apparent from FIGS. 4 and 7, if the actual heat-up ratio $d\theta/dt$, the reference heat-up ratio $d\theta_0/dt$ and the predetermined allowable limit $d\theta_1/dt$ are such that $d\theta/dt > d\theta_0/dt$ and $d\theta/dt > d\theta_1 dt$, the condition for opening the bypass valve 5 is satisfied. However, the valve 5 is opened only when the reactor pressure P is above a predetermined level $P_{cl}$, i.e. $P > P_{cl}$. The value of $P_{cl}$ is about 2 to 3 bar and the opening of the bypass valve 5 has no effect below this level. The degree of opening of the valve 5 is so determined in accordance with the difference A between $d\theta_1/dt$ and $d\theta/dt$ that the reactor may not be operated in the region where the actual heat-up ratio $d\theta/dt$ exceeds the allowable limit $d\theta_1/dt$. In order to improve the accuracy in the manipulation of the bypass valve 5, the bypass valve operating interval $t_{BP}$ is introduced and when the desired moment is reached, the sub-routine (see FIG. 12f) for actuating the valve 5 is started. After the bypass valve 5 has been actuated, the control rods are manipulated as described later. When $d\theta/dt$ exceeds $d\theta_1/dt$ at a certain instant, the bypass valve 5 is manipulated. If $d\theta/dt$ is still greater than $d\theta_1/dt$ even when a period of time equal to $t_{BP}$ lapsed after the completion of the manipulation, the degree of opening of the valve 5 is corrected in accordance with the valve of $A = d\theta/dt - d\theta_1/dt$. Since the period $\Delta t$ at which the computor is actuated is much shorter than the time during which the heat-up ratio changes due to the opening of the bypass valve, the computor is actuated over several tens of times the period $\Delta t$ for the time during which the bypass valve is manipulated. If the step where the bypass valve is manipulated is not selected, the valve is almost completely closed. An example of the time chart for manipulating the bypass valve is shown in FIG. 16. In the case stated above, if $P<P_{cl}$ and $d\theta/dt<d\theta_0/dt$ or $d\theta/dt<d\theta_1/dt$, the control rods are directly manipulated while if $d\theta/dt>d\theta_1/dt$, the control rods are manipulated only after the bypass valve has been manipulated.

Figure 12B:
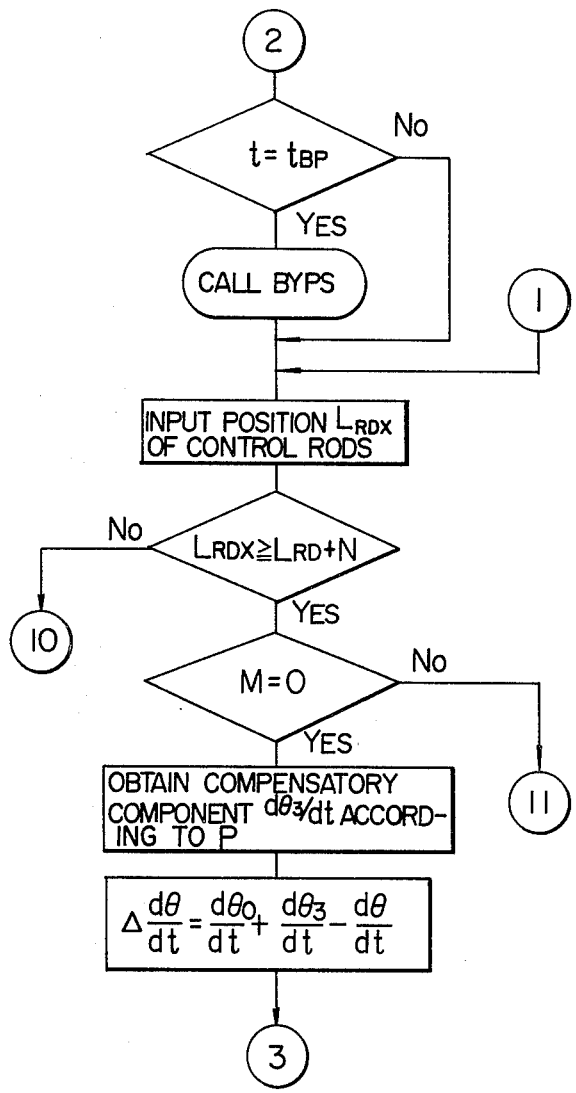

The manipulation of the control rods is performed as follows. As shown in FIG. 12b the compensatory heat-up ratios $d\theta_3/dt$ are previously determined for various values of the reactor pressure P and stored so that a compensatory component $d\theta_3/dt$ can be obtained for any instantaneous value of the reactor pressure. Next, the deviation component $\Delta(d\theta/dt)$ of the heat-up ratio $d\theta/dt$ is calculated in virtue of the following formula (3).

$$\Delta \frac{d\Theta}{dt} = \frac{d\Theta_o}{dt} + \frac{d\Theta_3}{dt} - \frac{d\Theta}{dt} \quad (3)$$

However, when this step is selected in the first place, $\Delta(d\theta/dt) = d\theta_0/dt$ since in that case both the compensatory component $d\theta hd\ 3/dt$ and the actual heat-up ratio $d\theta/dt$ are approximately equal to zero. When the deviation component $\Delta(d\theta/dt)$ is positive (+), there is a demand for inserting the control rods while the control rods need to be withdrawn when $\Delta(d\theta/dt)$ is negative (−).

Figure 12C:
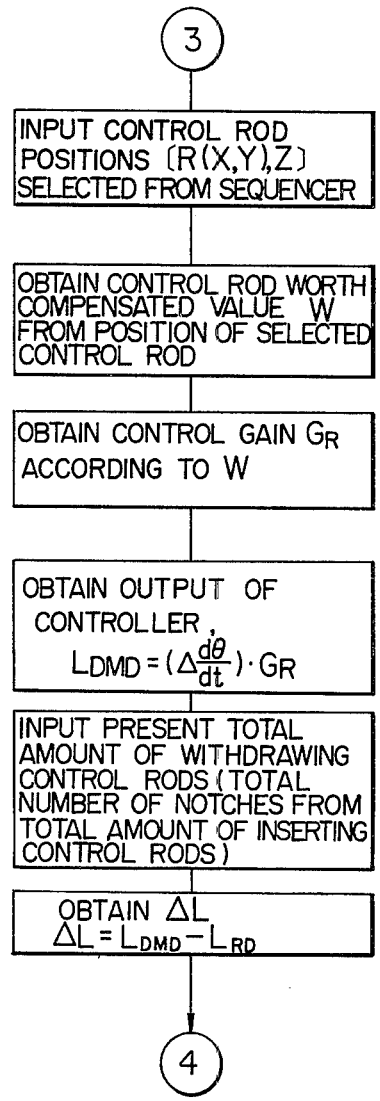

As described above, the loop gain of the closed loop control system is not constant since the reactivity effect due to the movement of a certain control rod by a certain distance varies depending upon the coordinates R(X,Y) and the distance of insertion Z of the control rod. The control rods are so manipulated as to maintain the loop gain constant. For this purpose, the computor is provided with means for maintaining the loop gain constant. As represented by the solid curve I in FIG. 12, the relationship between the insertion distance Z and the control rod worth, with respect to a standard control rod (located at, for example, the center of the reactor core) is an S-shaped characteristic. The non-linearlity in the characteristic makes the loop gain variable and the reactivity compensation characteristics W such as represented by dashed curves convex down are stored in the computor so as to compensate for the non-linearlity. The gain of the controller is therefore corrected on the basis of the present distance Z of the specified control rod, as shown in FIG. 12c et seq. Also, the control rod worth varies depending upon the coordinates R(X, Y). For example, the characteristic for a control rod near the periphery of the reactor core may vary following the solid curve II or III. And the characteristic is corrected also on the basis of the coordinates R(X, Y) so as to change the gain of the controller.

As shown in FIG. 12c, the coordinates R(X, Y) and the insertion distance Z of a selected control rod are read in. After the coordinates $R(X_o, Y_o)$ of the standard control rod (located at the center of the reactor core) stored in the computor have been compared with the coordinates R(X, Y) of the selected rod, the control rod worth compensation value W(Z) is obtained in accordance with, for example, the distance between the standard and the selected rods. Namely, if it is assumed that the dashed curve W-I is characteristic of $R(X_o, Y_o)$, the curve W-II corresponds to R(X,Y). The gain $G_R$ of the controller is obtained in accordance with the control rod worth compensation value W(Z) obtained with respect to the insertion distance Z of the selected rod. This is accomplished by, for example, correcting in accordance with W(Z) the proportionate band and/or the integrating time constant of the proportinal integrating circuit for obtaining an output in accordance with the deviation $\Delta(d\theta/dt)$. The output $L_{DMD}$ of the controller is then obtained by controlling the deviation $\Delta(d\theta/dt)$. The output $L_{DMD}$ is the demanded value for the total distance of withdrawal of all the control rods and more accurate than the corresponding notch number. The quantity $L_{RD}$ representing the present total distance of withdrawal of all the control rods in terms of notch number is introduced from the sequencer. The difference $\Delta L$ between the demanded value $L_{DMD}$ and the present value $L_{RD}$ is the manipulated variable of the control rods.

Figure 12D:
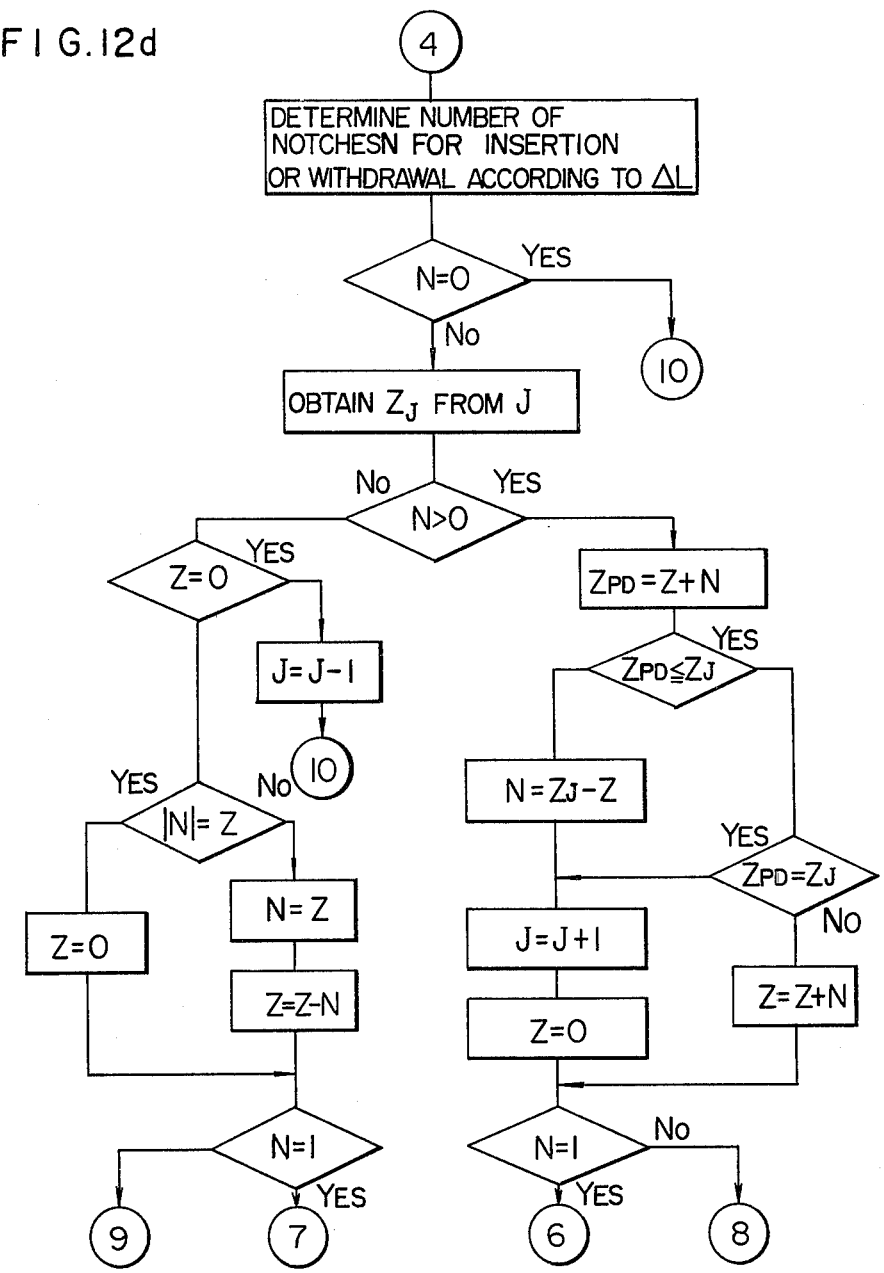
Figure 14:
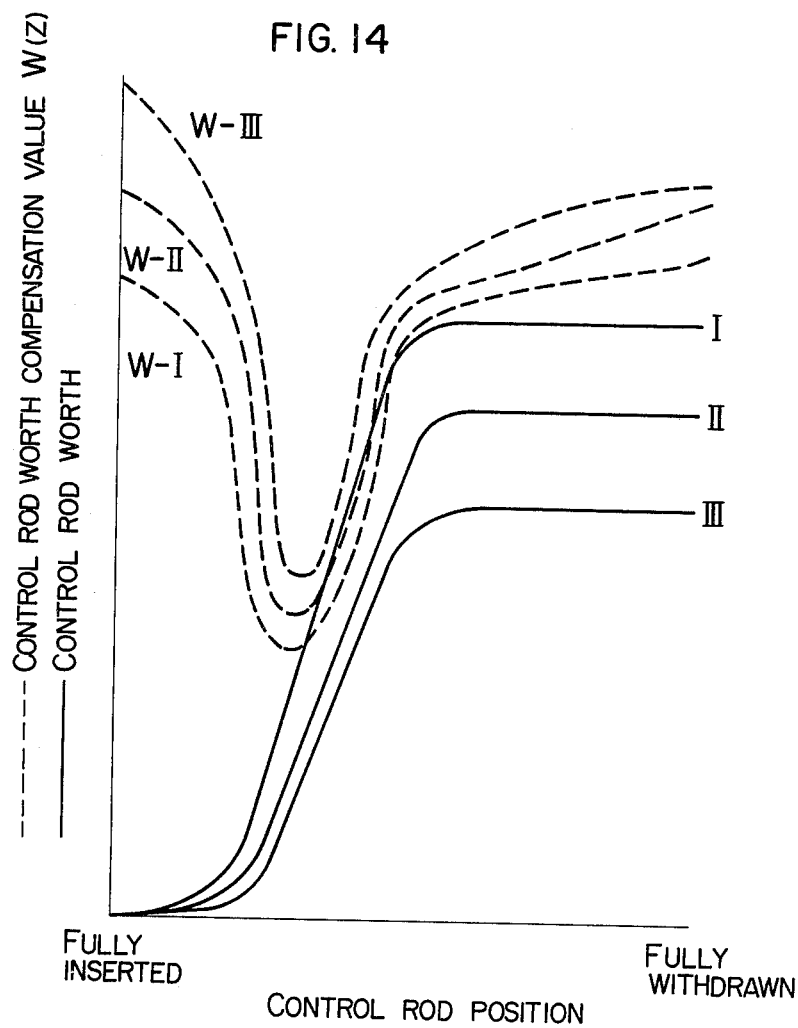
FIG. 14 shows the relationship between the control rod position and the control rod worth and between the control rod position and the control rod worth compensation value.
Figure 15:
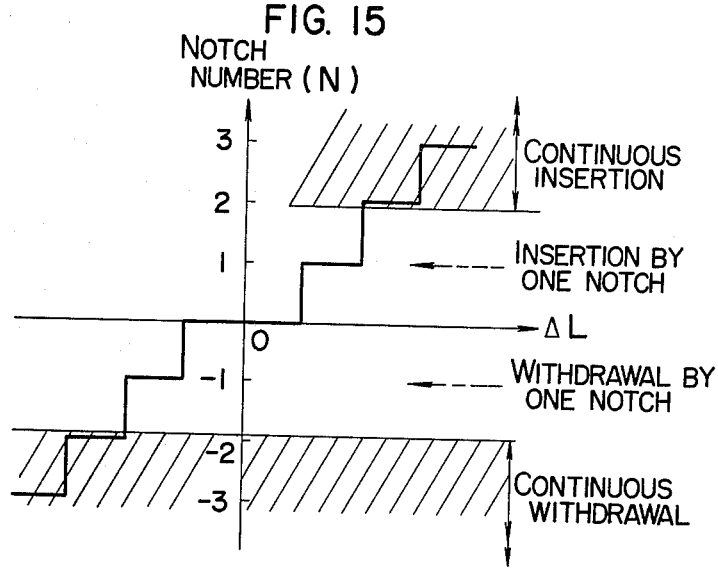
FIG. 15 illustrates how the control rod to be next controlled is withdrawn according to the difference between the output of the control device and the total amount of the distances of withdrawal of the control rods.

As shown in FIG. 12d the notch number N for withdrawing or inserting the control rods is then obtained, but since the demanded value $L_{DMD}$ mentioned above is more accurate than the corresponding notch number, $\Delta L$ is also more accurate than the corresponding notch number and the notch number of $\Delta L$ is obtained as shown in FIG. 15. For example, the notch number is obtained by rounding the value of $\Delta L$ so that $N = 2$ for $\Delta L = 1.5$ and $N = 1$ for $\Delta L = 1.4$.

If $N = 0$, the control rods are not manipulated at all. If $N \neq 0$, $Z_J$ is obtained by using the index J. The index J indicates the order of manipulating the control rods and the computor stores therein the index J, the coordinates R(X, Y) of the control rods to be manipulated, and the manipulated quantity $Z_J$. The manipulation of the control rods is performed as shown in the tabulation in FIG. 13, Namely, the control rods are withdrawn sequentially in accordance with the order J of manipulation, the coordinates R(X, Y) and the distance $Z_J$ of manipulation. Now, attention is concentrated upon a particular control rod. Then, the control rod can be stopped at 24 positions determined by dividing the distance of full movement (from position of full insertion to position of full withdrawal) of the rod into 23 equal parts. Accordingly, Z assumes values ranging from 1 to 24, represented as notch 1, notch 2 . . . notch 24. A reactor having a rated power of 460 MW has 97 control rods, the number of control rods depending upon the reactor thermal power. The systematic manipulation of the control rods as described above is especially useful to make uniform the distribution of the reactor thermal power in the reactor core when the reactor start-up procedure is completed and to prevent the local overheat in the reactor during the start-up procedure. The times of manipulation of control rods is usually in the order of $10^2$ to $10^3$. It should be noted here that the distance of movement of a rod covered by each manipulation must be chosen to be at most five notches. If the distance of more than five notches is employed, the error of the control rod worth compensation value increases.

Figure 17:
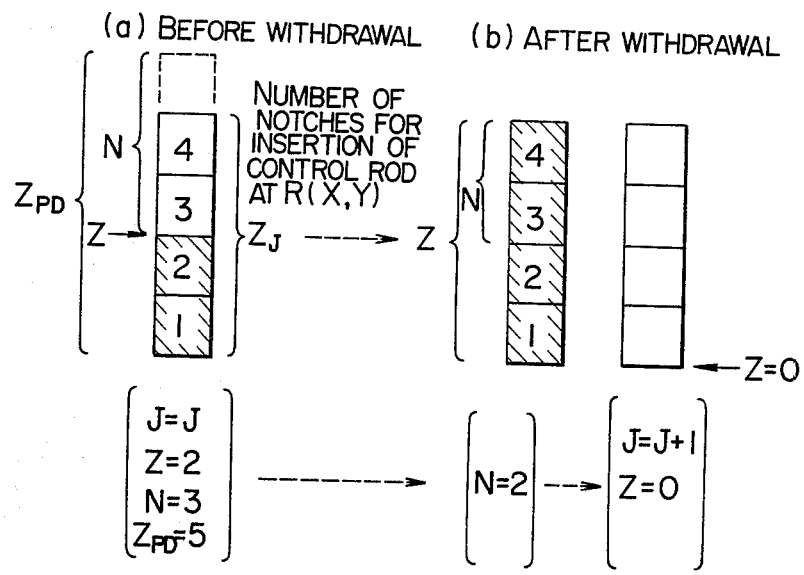
FIGS. 17 and 18 illustrate the ways of manipulation in case where more than one control rod are manipulated to satisfy the required condition.

After the distance has been obtained, N is again checked: if N is positive (+), the manipulation f withdrawal is initiated. Whether $Z_{PD}$ is greater than $Z_J$ or not is checked, where $Z_{PD} = Z + N$. If $Z_{PD} \leq Z_J$, whether $Z_{PD}$ equals $Z_J$ or not is checked. If $Z_{PD} = Z_J$, the rod insertion distance Z is renewed such that $Z = Z + N$. On the other hand, if $Z_{PD} \neq Z_J$, the index J is increased by unity and Z is put equal to zero, i.e. $Z = 0$. Thereafter, when $N = 1$, the rod is withdrawn by one notch while the rod is continuously withdrawn for $N \neq 1$. FIG. 17 shows how the condition having $N = 2$ is established in case where $Z_j = 4$, $Z = 2$ and $N = 3$. In this way, when $N + Z > Z_j$, N is decreased so that the rod cannot be withdrawn by a distance greater than $Z_j$.

Figure 18:
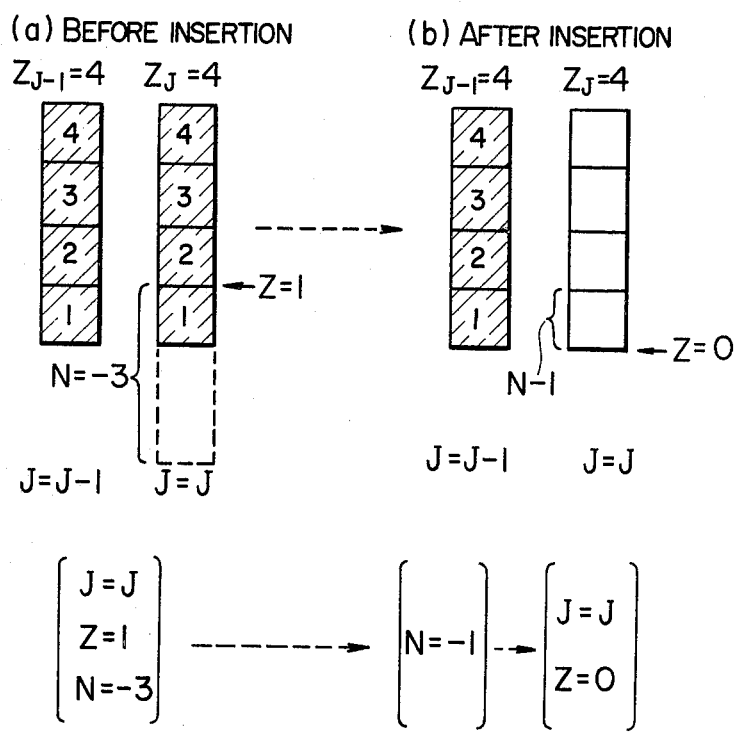

On the other hand, when N is negative (−), whether Z equals zero or not is checked. If $Z = 0$, J is renewed such that $J = J = 1$, and the previously performed step is resumed, the control rod being not manipulated. The resumption of the earlier step is necessary to obtain a new control rod worth compensation value for different coordinates R(X, Y). When $|N| = Z$, it follows that $Z = 0$. However, when $|N| \neq Z$, N is put equal to Z and Z is renewed such that $Z = Z - N$. Thereafter, whether N equals unity or not is checked to determine whether the rod is inserted by one notch or not. FIG. 18 shows how the condition having $N = -1$ is established in case where $N = -3$ and $Z = 1$.

In FIG. 12e, four cases are shown: continuous insertion by N notches, insertion by only one notch, withdrawal by only one notch, and continuous withdrawal by N notches. The manipulation of control rods is thus initiated in accordance with any of the cases. At this time, the control rod operating condition index M equals unity and the flow of control returns to the point ⑩ just after the START instruction.

The information of the control rod position $L_{RDX}$ is read in at regular intervals $\Delta t$ and whether the rod is shifted by a predetermined distance, i.e. N notches, is checked as shown in FIG. 12b. After the rod has been shifted by N notches, the flow of control returns to the point ⑪ in FIG. 12e when $M \neq 0$. Then, the present total number $L_{RD}$ of notches of withdrawal is renewed here and the renewed quantity is delivered to the sequencer. Thereafter, the index M is put equal to zero and the flow of control returns to the point ⑩.

As described above, the present invention can be realized by the use of a digital computor and such embodiments as shown in FIGS. 7 and 9 or the embodiment in which the heat-up ratio is compensated on the basis of the reactor temperature instead of the reactor pressure, are practicable even in that case.

We claim:

1. An apparatus for automatically starting up a nuclear reactor during a heat-up and pressurization phase of start-up, comprising a plurality of control rods disposed in a reactor core, a control rod driving means for inserting and withdrawing said control rods into and out of said reactor core, temperature detecting means for detecting reactor temperature, heat-up ratio calculator means for calculating a rate of change in the output of said temperature detector means, heat-up ratio reference means for providing a predetermined heat-up ratio value of said reactor temperature, said control rod driving means manipulating said control rods in accordance with the deviation of the output of said heat-up ratio calculator means from the output of said heat-up ratio reference means so as to maintain the heat-up ratio of said reactor temperature at the predetermined value, and heat-up ratio compensation means for correcting said heat-up ratio of said reactor temperature in accordance with at least one condition in said reactor for maintaining said heat-up ratio at the predetermined value during the heat-up and pressurization phase of start-up of said nuclear reactor.

2. An apparatus as claimed in claim 1, wherein said heat-up ratio compensation means is responsive to reactor pressure for providing an output for correcting said heat-up ratio.

3. An apparatus according to claim 2, wherein said heat-up ratio compensation means provides the correcting output in response to the reactor pressure reaching a predetermined value.

4. An apparatus as claimed in claim 3, wherein said heat-up ratio compensation means is responsive to reactor temperature for providing an output for correcting said heat-up ratio.

5. An apparatus according to claim 4, wherein said heat-up ratio compensation means provides the correcting output in response to the reactor temperature reaching a predetermined value.

6. An apparatus as claimed in claim 1, further comprising a detector for detecting a reactor thermal power and a reactor thermal power setting means for producing reference signals for reactor thermal power from the outputs of said heat-up ratio reference, said heat-up ratio calculator and said heat-up ratio compensation means and wherein the difference between the outputs of said reactor power setting means and said reactor thermal power detector is applied to said control rod driving means.

7. An apparatus as claimed in claim 1, further comprising a turbine driven by steam generated in said reactor, a condenser for turning the stream having performed work on said turbine into water and a bypass valve for directly conducting said steam generated in said reactor to said condenser and means for lowering said heat-up ratio by opening said bypass valve when said heat-up ratio exceeds a limiting value.

8. An apparatus as claimed in claim 1, wherein said control rod driving means is means for sequentially shifting said control rods by distances proper to said respective rods and in a predetermined order.

9. An apparatus for automatically starting up a nuclear reactor comprising a pressure vessel of said nuclear reactor for receiving a reactor core, a plurality of control rods disposed in said reactor core, control rod driving means for inserting and withdrawing said control rods into and out of said reactor core, a temperature detector for detecting a wall temperature of said pressure vessel, a heat-up ratio calculator for calculating a rate of change in the output of said temperature detector, a heat-up ratio reference for setting a heat-up ratio of said wall temperature of said pressure vessel, and a deviation detector for providing a deviation of the output of said heat-up ratio calculator from the output of said heat-up ratio reference, said control rods being manipulated by said control rod driving means in accordance with the output of said deviation detector, means for allowing the manipulation of said control rods in accordance with the output of said deviation detector only during the period from the point of time where said nuclear reactor has reached a critical state to the point of time where the temperature and the pressure of steam generated in said nuclear reactor reach respective predetermined values, a pressure detector for detecting a pressure of said nuclear reactor, and heat-up ratio compensation means responsive to the output of said pressure detector for compensating said heat-up ratio of said wall temperature in a direction of increasing said heat-up ratio of said wall temperature as the detected pressure increases when the detected pressure exceeds a predetermined value of which the water within said nuclear reactor begins to boil.

10. An apparatus for automatically starting up a nuclear reactor comprising a pressure vessel of said nuclear reactor for receiving a reactor core, a plurality of control rods disposed in said reactor core, control rod driving means for inserting and withdrawing said control rods into and out of said reactor core, a temperature detector for detecting a wall temperature of said pressure vessel, a heat-up ratio calculator for calculating a rate of change in the output of said temperature detector, a heat-up ratio reference for setting a heat-up ratio of said wall temperature of said pressure vessel, and a deviation detector for providing a deviation of the output of said heat-up ratio calculator from the output of said heat-up ratio reference, said control rods being manipulated by said control rod driving means in accordance with the output of said deviation detector, means for allowing the manipulation of said control rods in accordance with the output of said deviation detector only during the period from the point of time where said nuclear reactor has reached a critical state to the point of time where the temperature and the pressure of steam generated in said nuclear reactor reach respective predetermined values, and heat-up ratio compensation means responsive to the output of said temperature detector for compensating said heat-up ratio of said wall temperature in a direction of increasing said heat-up ratio of said temperature as the detected temperature increases when the detected temperature exceeds a predetermined value at which the water within said nuclear reactor begins to boil.

* * * * *